(12) United States Patent
Rimet

(10) Patent No.: US 9,999,929 B2
(45) Date of Patent: Jun. 19, 2018

(54) CUTTING HEAD AND CUTTING TOOL HAVING A REPLACEABLE CUTTING HEAD

(71) Applicant: SECO TOOLS AB, Fagersta (SE)

(72) Inventor: Lilian Rimet, Saint Sauveur (FR)

(73) Assignee: SECO TOOLS AB, Fagersta (SE)

( * ) Notice: Subject to any disclaimer, the term of this patent is extended or adjusted under 35 U.S.C. 154(b) by 175 days.

(21) Appl. No.: 14/434,439

(22) PCT Filed: Oct. 8, 2013

(86) PCT No.: PCT/EP2013/070908
§ 371 (c)(1),
(2) Date: Apr. 9, 2015

(87) PCT Pub. No.: WO2014/056888
PCT Pub. Date: Apr. 17, 2014

(65) Prior Publication Data
US 2015/0266101 A1    Sep. 24, 2015

(30) Foreign Application Priority Data

Oct. 11, 2012   (EP) ..................................... 12188119
Oct. 11, 2012   (EP) ..................................... 12188124
Oct. 11, 2012   (EP) ..................................... 12188185

(51) Int. Cl.
*B23B 31/00* (2006.01)
*B23B 31/107* (2006.01)
(Continued)

(52) U.S. Cl.
CPC .......... *B23B 31/005* (2013.01); *B23B 31/008* (2013.01); *B23B 31/1071* (2013.01);
(Continued)

(58) Field of Classification Search
CPC . B23B 31/005; B23B 31/008; B23B 31/1071; B23B 2231/0204;
(Continued)

(56) References Cited

U.S. PATENT DOCUMENTS 2,383,212 A * 8/1945 Pohle ................... B23B 31/005
408/226
3,053,118 A * 9/1962 Lavallee ............... B23B 31/006
403/279

(Continued)

FOREIGN PATENT DOCUMENTS

DE     10100024 A1 * 7/2002 ......... B23B 31/1071
EP     0181093 A1    5/1986
(Continued)

OTHER PUBLICATIONS

English translation of EP 1215000 A1, Jun. 2002.*

*Primary Examiner* — Alan Snyder
(74) *Attorney, Agent, or Firm* — Corinne R. Gorski

(57) ABSTRACT

A cutting head for a cutting tool includes a cutting portion and a shank portion. The cutting portion has a plurality of integrally formed cutting edges and the shank portion has a first end adjacent the cutting portion and a second end. The first portion of the shank portion is closer to the first end of the shank portion than the second and third portions of the shank portion and the third portion of the shank portion is disposed closer to the second end of the shank portion than the first and second portions. The first portion of the shank portion has an exterior surface including at least one axially extending recess extending from an end of the first portion closest to the second portion toward the first end of the shank portion. The cutting head is formed of a pressed and sintered cemented carbide material.

16 Claims, 4 Drawing Sheets

(51) Int. Cl.
*B23D 77/00* (2006.01)
*B23C 5/10* (2006.01)

(52) U.S. Cl.
CPC ................ *B23C 5/10* (2013.01); *B23D 77/00* (2013.01); *B23D 77/006* (2013.01); *B23B 2231/0204* (2013.01); *B23B 2231/026* (2013.01); *B23B 2231/0264* (2013.01); *B23B 2231/0268* (2013.01); *B23B 2251/02* (2013.01); *B23C 2210/02* (2013.01); *B23C 2210/03* (2013.01); *B23C 2222/28* (2013.01); *B23C 2250/12* (2013.01); *Y10T 407/14* (2015.01); *Y10T 407/1906* (2015.01); *Y10T 407/1952* (2015.01)

(58) Field of Classification Search
CPC ...... B23B 2231/026; B23B 2231/0264; B23B 2231/0268; B23B 2251/02; B23C 2210/02; B23C 2210/03
See application file for complete search history.

(56) References Cited

U.S. PATENT DOCUMENTS

| | | | | |
|---|---|---|---|---|
| 3,333,490 | A | * | 8/1967 | Popin .................... B23B 31/005 408/226 |
| 5,316,323 | A | * | 5/1994 | Jovanovic ........... B23B 31/1071 279/22 |
| 2009/0110497 | A1 | * | 4/2009 | Miller .................... B23B 31/005 408/47 |
| 2009/0110500 | A1 | * | 4/2009 | Miller .................... B23B 31/005 408/204 |
| 2012/0003057 | A1 | * | 1/2012 | Leyba .................... B23B 31/005 408/226 |
| 2013/0022415 | A1 | * | 1/2013 | Osawa ................. B23B 31/1107 407/46 |

FOREIGN PATENT DOCUMENTS

| | | | | |
|---|---|---|---|---|
| EP | 1215000 | A1 | * 6/2002 | ........... B23B 31/005 |
| EP | 1674182 | A1 | 6/2006 | |
| GB | 1513386 | | 6/1978 | |
| GB | 1513386 | A | * 6/1978 | ........... B23B 31/005 |

* cited by examiner

CUTTING HEAD AND CUTTING TOOL HAVING A REPLACEABLE CUTTING HEAD

RELATED APPLICATION DATA

This application is a § 371 National Stage Application of PCT International Application No. PCT/EP2013/070908 filed Oct. 8, 2013 claiming priority of EP Application Nos. 12188185.8; 12188119.7; and 12188124.7, all filed Oct. 11, 2012.

BACKGROUND AND SUMMARY

The present invention relates to a cutting head for a cutting tool and, more particularly, to a replaceable cutting head.

It is often useful to provide replaceable cutting heads on toolholders to permit replacing small, relatively quickly worn parts of a cutting tool without also requiring replacement of larger shank structures. One solution for attaching a replaceable cutting head to a toolholder is provided by the PRECIMASTER head reamer tool available from Seco Tools AB, Fagersta, Sweden. The attachment arrangement provided by the PRECIMASTER tool provides a number of strengths, such as run out precision, ease of use, and permitting sending coolant or flushing liquid through the tool. However, transmission of torque between the shank and the cutting head is done via a pin that extends through the shank and the cutting head. It is also difficult to form the entire cutting head in a monobloc construction because of complex shapes used for connection of the cutting head to the shank. This drawback has made it necessary to braze cutting inserts onto a steel body, which has made it impossible to provide larger numbers of teeth or cutting edges on smaller diameter cutting heads. For example, it is not possible to have six teeth on cutting heads with 10 mm or 12 mm diameters. Certain cutting head designs, such as in EP0181093A1, present difficulties because they require complex arrangements for torque transmission that present difficulties with respect to size or strength of the toolholders that would receive them.

It is desirable to provide a cutting head and a cutting tool that can be made in a monobloc construction in very small diameters while permitting provision of large numbers of teeth. It is also desirable to provide a cutting head and cutting tool that provide a simple torque transmission arrangement.

According to an aspect of the present invention, a cutting head for a cutting tool comprises a cutting portion and a shank portion. The cutting portion comprises a plurality of integrally formed cutting edges, and the shank portion has a first end adjacent the cutting portion and a second end. The shank portion has a first portion of the shank portion having a first diameter, a second portion of the shank portion having a second diameter smaller than the first diameter, and a cylindrical third portion of the shank portion having a third diameter larger than the second diameter, the first portion of the shank portion being closer to the first end of the shank portion than the second and third portions of the shank portion and the third portion of the shank portion being disposed closer to the second end of the shank portion than the first and second portions of the shank portion, the first portion of the shank portion having an exterior surface comprising at least one axially extending recess extending from an end of the first portion of the shank portion closest to the second portion of the shank portion toward the first end of the shank portion.

According to another aspect of the present invention, a cutting tool comprises a cutting head comprising a cutting portion and a shank portion, the shank portion having a first end adjacent the cutting portion and a second end, the cutting portion and the shank portion being integrally formed of a uniform material, the cutting portion comprising a plurality of integrally formed cutting edges, and the shank portion having a first portion of the shank portion having a first end and a second end, the first end of the first portion of the shank portion being closer to the cutting portion than the second end, the first portion of the shank portion having a first diameter, and a toolholder comprising a body comprising a first end and a second end, and an axial opening extending from the first end toward the second end, the axial opening comprising a first portion having a first diameter at least as large as the first diameter of the first portion of the shank portion. The first portion of the shank portion has an exterior surface comprising at least one axially extending recess extending from an end of the first portion of the shank portion furthest from the cutting portion toward the first end of the shank portion of the shank portion, the first portion of the axial opening has an interior surface comprising at least one axially extending recess, and at least one ball or axially extending pin is disposed in the at least one axially extending recess of the exterior surface of the first portion of the shank portion and the at least one axially extending recess of the interior surface of the first portion of the axial opening so that the cutting head is non-rotatable relative to the toolholder.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
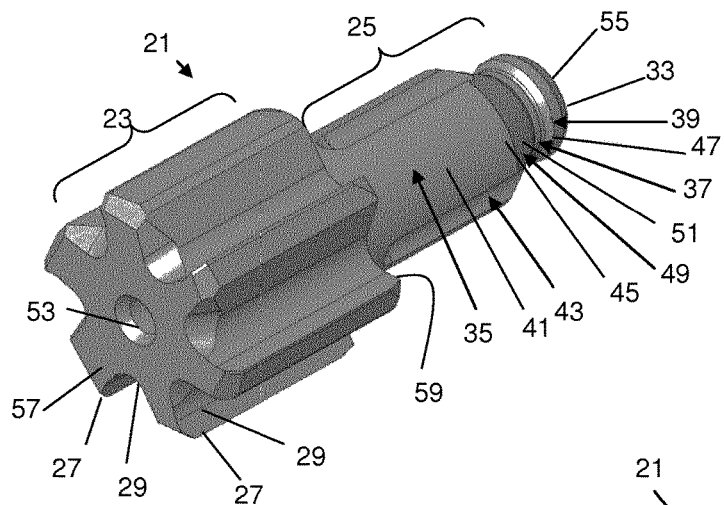
FIGS. 1A, 1B, and 1C are top perspective, bottom perspective, and side views, respectively, of a cutting head according to an aspect of the present invention.
Figure 1B:
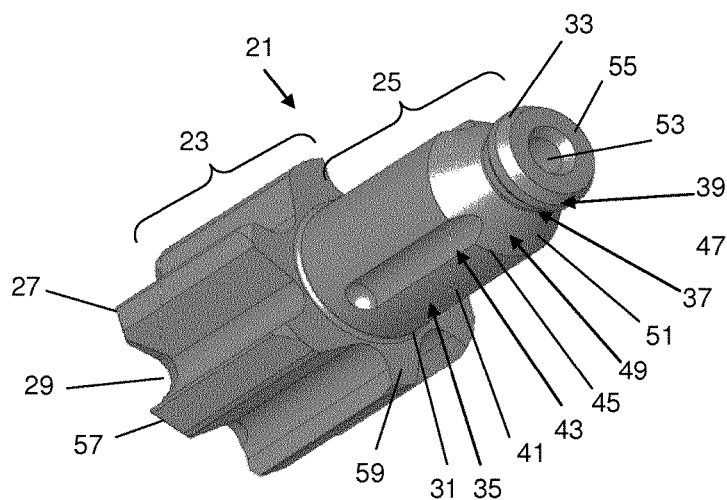
Figure 1C:
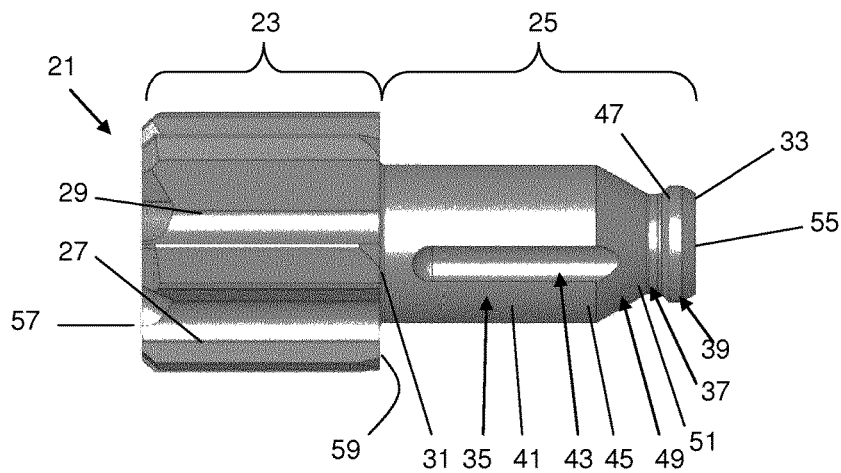

A cutting head 21 for a cutting tool is seen in FIGS. 1A-1C. The cutting head 21 can be used with a plurality of different types of toolholders to form the cutting tool. The cutting head 21 comprises a cutting portion 23 and a shank portion 25. The cutting portion 23 comprises a plurality of integrally formed cutting edges 27. The cutting edges 27 at least partially define a corresponding plurality of flutes 29. The cutting edges 27 and flutes 29 can be helical or, as seen in FIGS. 1A-1C, straight, i.e., generally parallel to the longitudinal axis of the cutting head 21.

The shank portion 25 has a first end 31 adjacent the cutting portion 23 and a second end 33. The shank portion 25 ordinarily has a smaller maximum width or diameter than a widest portion of the cutting portion The shank portion 25 has a first portion 35 having a first diameter, a second portion 37 having a second diameter smaller than the first diameter, and a third portion 39 having a third diameter larger than the second diameter. The first portion 35, the second portion 37, and the third portion 39 are ordinarily all cylindrical, i.e., have exterior surfaces that extend parallel to the longitudinal axis of the cutting head 21, and, more particularly, are ordinarily all circularly cylindrical, i.e., circular in cross-section. The third diameter is usually the same as or smaller than the first diameter. The first portion 35 of the shank portion 25 is closer to the first end 31 of the shank portion than the second and third portions 37 and 39 of the shank portion and the third portion of the shank portion is disposed closer to the second end 33 of the shank portion than the first and second portions.

The first portion 35 has an exterior surface 41 comprising at least one axially extending recess 43 extending from an end 45 of the first portion closest to the second portion 37 toward the first end 31 of the shank portion. Ordinarily, a plurality of axially extending recesses 43 are equally spaced around the first portion 35, such as three recesses spaced every 120° around the longitudinal axis of the cutting head 21. A surface of each recess 43 has a radius that is less than a radius of the exterior surface 41 of the first portion 35 of the shank portion 25.

While the first portion 35 of the shank portion 25 might be adjacent to the second portion 37 of the shank portion, and second portion of the shank portion might be adjacent to the third portion 39 of the shank portion, ordinarily a transition region 47 is provided between the third portion of the shank portion and the second portion of the shank portion and a transition region 49 is provided between the first portion of the shank portion and the second portion of the shank portion. The transition regions 47 and 49 are ordinarily frustoconical. The one or more axially extending recesses 43 end on a surface 51 of the frustoconical transition region 49 between the first portion 35 of the shank portion 25 and the second portion 37 of the shank portion.

A passage 53 can be provided through the cutting head 21 extending from an end 55 of the cutting head by the shank portion 25 toward an opposite end 57 of the cutting head by the cutting portion 23. The passage 53 can be used for delivering fluid to the cutting head 21 during a cutting operation to facilitate cooling and/or flushing of debris. Ordinarily, the passage 53 extends from the end 55 of the cutting head 21 to the opposite end 57 of the cutting head along a central axis of the cutting portion. The passage 53 may, however, be offset from the central axis of the cutting head 21, multiple passages may be provided, and parts or all of the passages may extend at angles to the longitudinal axis of the cutting tool, such as for delivering fluid to points below the end 57 of the cutting head 21.

The cutting head 21 structure as described facilitates integrally forming the cutting head of a uniform material, i.e., as a so-called "monobloc", such as entirely forming the cutting head of a injection molded or pressed, and sintered cemented carbide material. The material may also be high speed steel or cemented carbide that is formed by machining operations such as grinding. By the term "cemented carbide" is here meant WC, TiC, TaC, NbC, etc., in sintered combination with a binder metal such as, for instance, Co or Ni. The cutting head is preferably at least partly coated with layers of, e.g., $Al_2O_3$, TiN and/or TiCN. The shapes of the parts of the cutting head 21 need not be complex and can be easily pressed without the need to braze cutting inserts onto a steel body. The simple shape facilitates providing a relatively large number of cutting edges 27 on relatively small diameter cutting portions 23. For example, on cutting heads 21 with cutting portions 23 having 10 mm or 12 mm diameters, or diameters no greater than 15 mm, up to about 6 cutting edges 27 have been formed and, on cutting heads with cutting portions no greater than 16 mm, about eight cutting edges having been provided.

As seen in FIGS. 2A-2D, the cutting head 21 can be used in a cutting tool 101 comprising a toolholder 121. The toolholder 121 comprises a body 123 comprising a first end 125 and a second end 127, and an axial opening 129 (FIGS. 2A and 3) extending from the first end toward the second end. The axial opening 129 comprises a first portion 131 having a first diameter at least as large as the first diameter of the first portion 35 of the shank portion 25 so that the shank portion is adapted to extend into the axial opening, usually up to a point where the bottom 59 of the cutting portion 23 of the cutting head 21 abuts or is close to the first end 125 of the body 123 of the toolholder.

Figure 2A:
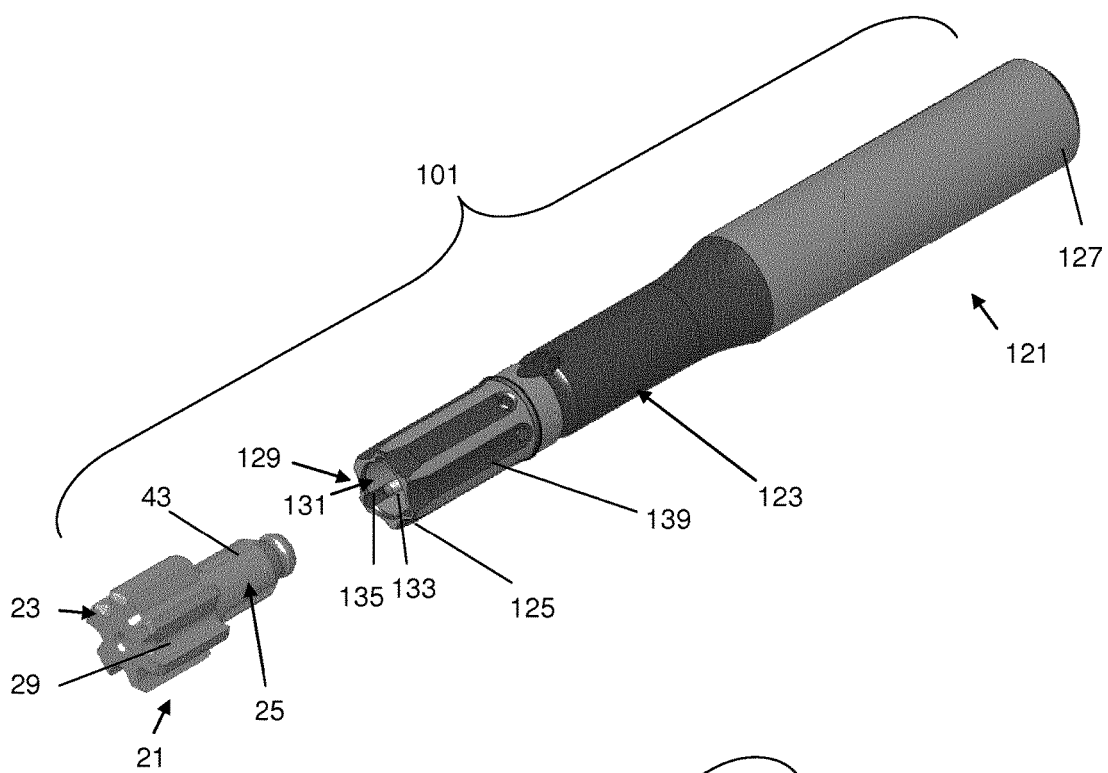
FIGS. 2A, 2B, 2C, and 2D are perspective exploded, perspective, partial perspective, and cross-sectional views of a cutting tool according to an aspect of the present invention.
Figure 2B:
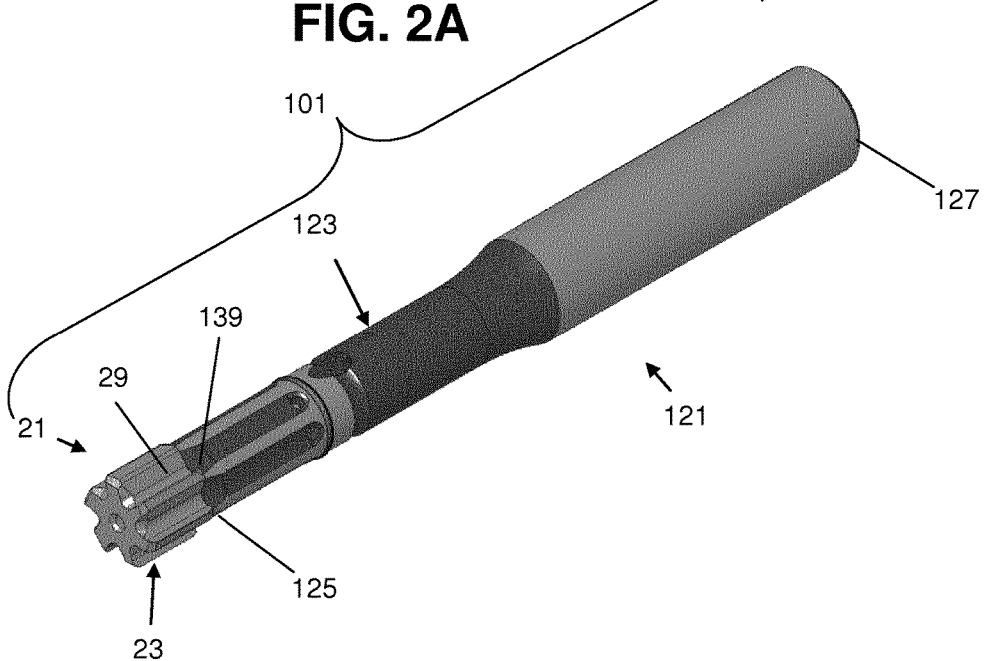
Figure 2C:
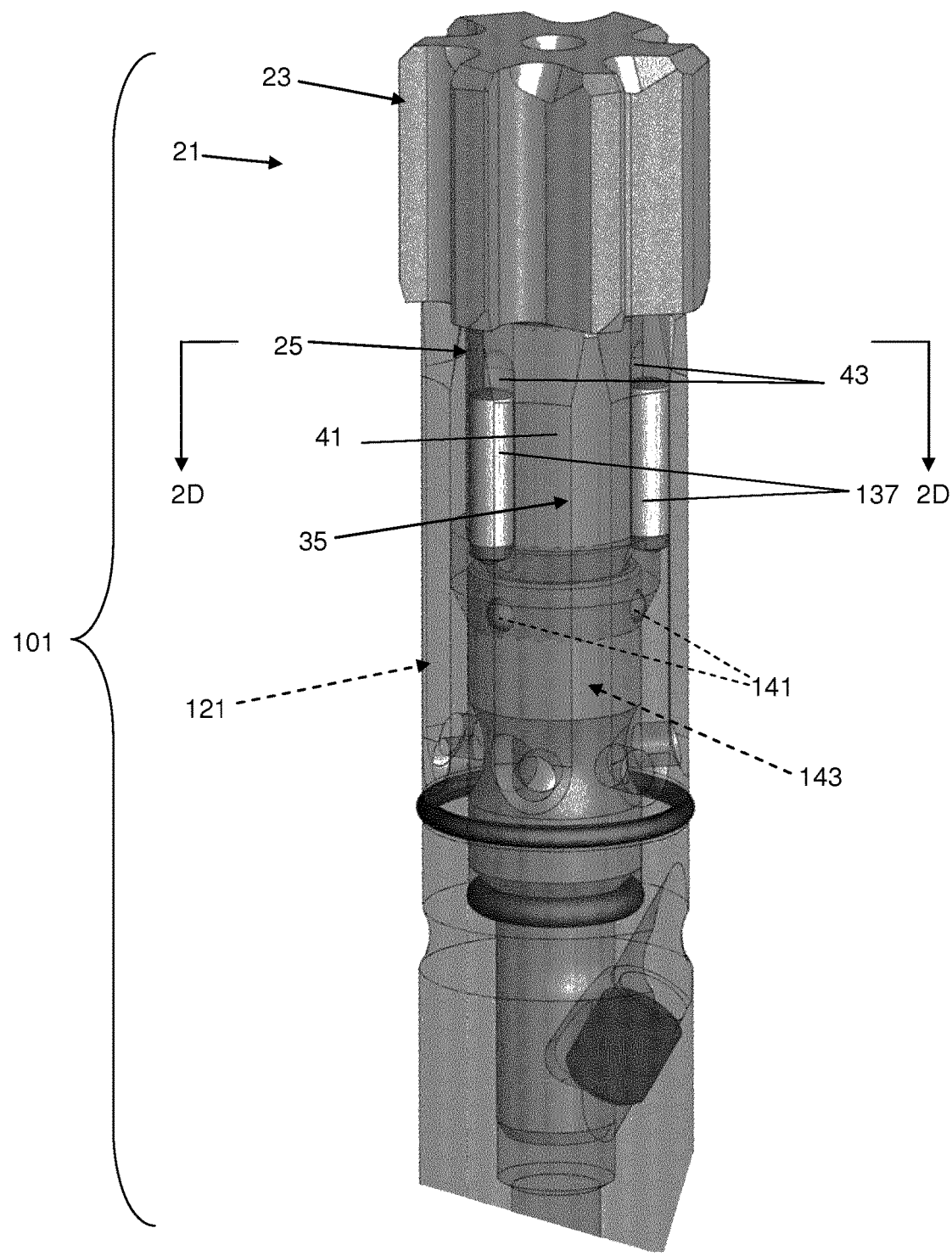
Figure 2D:
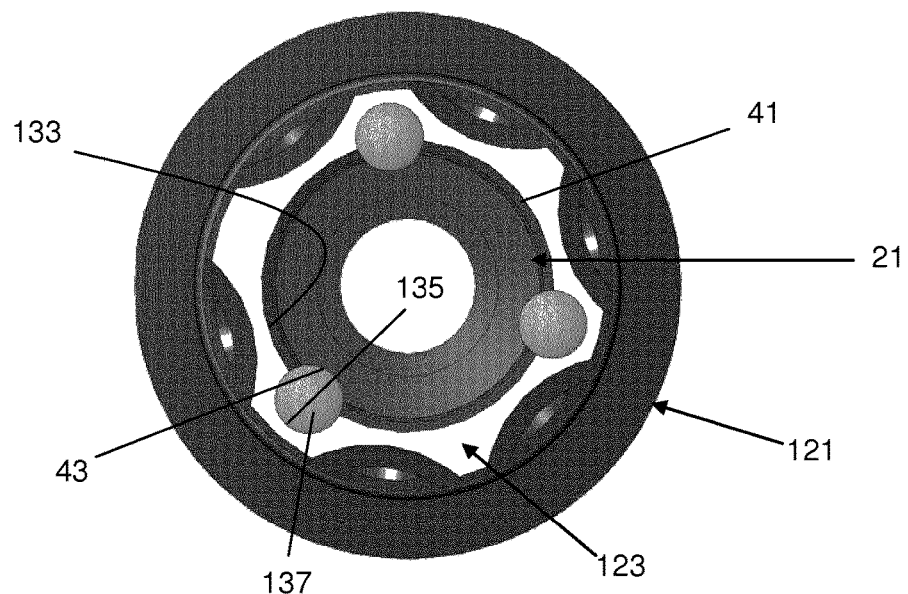
Figure 3:
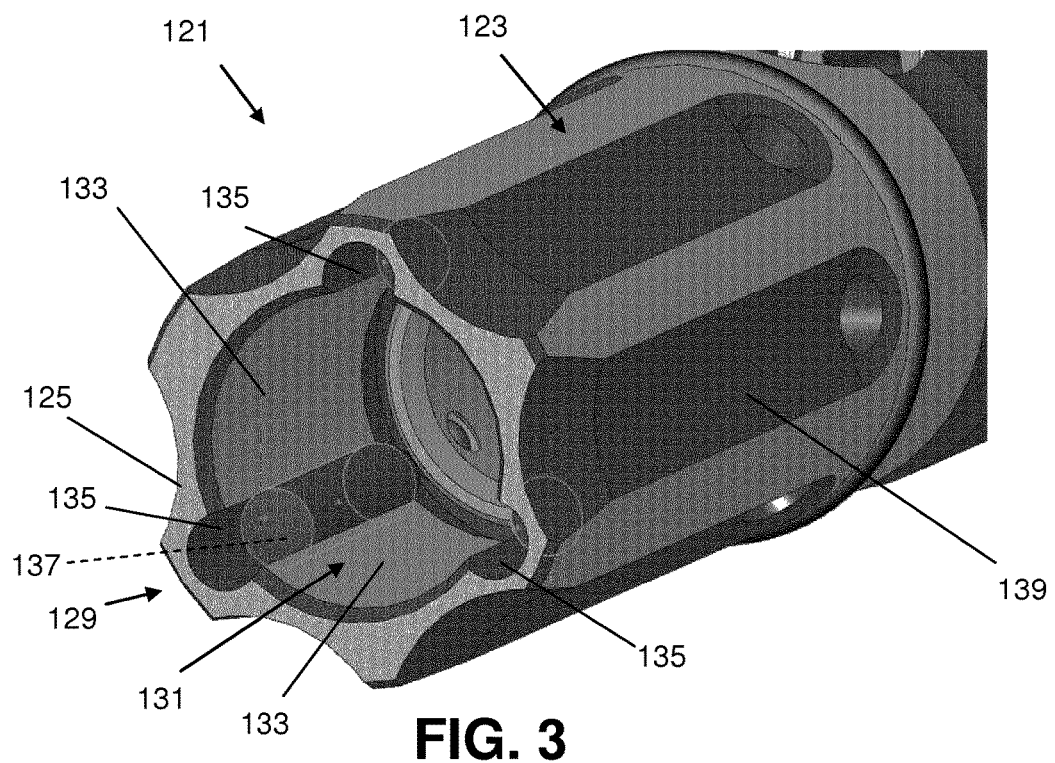
FIG. 3 is a perspective view of a toolholder according to an aspect of the present invention.

The first portion 131 of the axial opening 129 has an interior surface 133 comprising at least one axially extending recess 135, usually the same number of recesses as are provided on the exterior surface 41 of the first portion 35 of the shank portion 25. As seen in FIG. 2C (showing the toolholder 121 in phantom) and FIG. 2D, at least one ball or, or more typically, an axially extending pin 137 is disposed in each axially extending recess 43 of the exterior surface 41 of the first portion 35 of the shank portion 25 and in a corresponding axially extending recess 135 of the interior surface 133 of the first portion 131 of the axial opening 129 so that the cutting head 21 is non-rotatable relative to the toolholder 121. In this way, torque transmission between the toolholder 121 and the cutting head 21 is accomplished without the need for radially extending pins extending through both the toolholder and the cutting head.

The body 123 ordinarily comprises a plurality of flutes 139. As seen, for example, in FIG. 2B, the plurality of flutes 29 on the cutting head 21 align with the plurality of flutes 139 on the body 123 when the ball(s) or axially extending pin(s) are disposed in the axially extending recess(es) 43 of the exterior surface 41 of the first portion 35 of the shank portion 25 and the axially extending recess(es) 135 of the interior surface 133 of the first portion 131 of the axial opening 129.

By providing the shank portion 25 with a third portion 39 that has a larger diameter than the second portion 37, the third portion 39 forms a lip that can be gripped to retain the shank portion of the cutting head 21 in the axial opening 129 of the toolholder 121. FIG. 2C shows an embodiment of a gripping structure in the form of a plurality of balls 141 that extend through holes in a clamping member 143 and into the recess defined by the third portion 39 and the second portion 37 of the shank portion 25 of the cutting head 25. Consequently, the depth of the recess defined by the third portion 39 and the second portion 37 should be of sufficient size to receive a gripping structure of sufficient size to hold the shank portion 25 in the toolholder 121 and resist forces tending to pull the cutting head 21 away from the toolholder during operation. The clamping member 143 is movably disposed in the axial opening 129. A variety of different arrangements for gripping the shank portion 25 to retain the cutting head 21 relative to the toolholder 121 are disclosed in commonly-assigned, EP application numbers 12188119.7 and 12188124.7, entitled TOOLHOLDER WITH MOVING BALL CLAMPING ARRANGEMENT AND CUTTING TOOL HAVING A TOOLHOLDER AND A REPLACEABLE CUTTING HEAD and TOOLHOLDER WITH ELASTIC FINGER CLAMPING ARRANGEMENT AND CUTTING TOOL HAVING A TOOLHOLDER AND A REPLACEABLE CUTTING HEAD, respectively, incorporated by reference in the present application.

An effective clamping arrangement can be provided with the present teaching that ensures that a tool head will be securely clamped in a toolholder without compromising the strength or dimensions of the toolholder. The claimed structure offers advantages including permitting use of a toolholder that has a smaller diameter proximate the position at which the third portion of the shank will be disposed when mounted. In addition, the claimed structure facilitates sliding the tool head into an axial opening in a toolholder over non-retractable balls or cylinders to facilitate torque transmission, which would not be possible if the third portion were of the same diameter as the first portion.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application Nos. 12188185.8, 12188119.7 and 12188124.7 from which this application claims priority, are incorporated herein by reference.

The invention claimed is:

1. A cutting head for a cutting tool, comprising:
   a cutting portion, the cutting portion having a plurality of integrally formed cutting edges;
   a shank portion, the shank portion having a first end adjacent the cutting portion and a second end, wherein the shank portion has a first portion having a first diameter, a second portion having a second diameter smaller than the first diameter of the first portion, and a cylindrical third portion having a third diameter larger than the second diameter of the second portion and smaller than the first diameter of the first portion, the first portion being closer to the first end than the second and third portions and the third portion being disposed closer to the second end than the first and second portions, the first portion of the shank portion having an exterior surface including at least one axially extending recess extending parallel to a longitudinal axis of the cutting head from an end of the first portion closest to the second portion toward the first end of the shank portion, and in that the cutting head is entirely formed of a pressed and sintered cemented carbide material; and
   a first frustoconical transition region disposed between the first and second portions of the shank portion, wherein the at least one axially extending recess extends into and ends on a surface of the first frustoconical transition region.

2. The cutting head as set forth in claim 1, further comprising a second frustoconical transition region disposed between the third and the second portion of the shank portion.

3. The cutting head as set forth in claim 1, further comprising a passage extending from an end of the cutting head by the shank portion toward an opposite end of the cutting head by the cutting portion.

4. The cutting head as set forth in claim 3, wherein the passage extends from the end of the cutting head to the opposite end of the cutting head.

5. The cutting head as set forth in claim 3, wherein the passage extends along a central axis of the cutting portion.

6. The cutting head as set forth in claim 1, wherein the first portion of the shank portion is generally circular in cross-section.

7. The cutting head as set forth in claim 1, wherein a surface of the at least one axially extending recess has a radius that is less than a radius of the exterior surface of the first portion of the shank portion.

8. The cutting head as set forth in claim 1, further comprising at least three axially extending recesses.

9. The cutting head as set forth in claim 1, wherein an external diameter of the cutting portion is no greater than 15 mm and there are 6 cutting edges.

10. The cutting head as set forth in claim 1, wherein an external diameter of the cutting portion is no greater than 16 mm and there are 8 cutting edges.

11. The cutting head as set forth in claim 1, wherein the first portion of the shank portion is cylindrical.

12. The cutting head as set forth in claim 1, wherein a greatest depth of the at least one axially extending recess is disposed at a radius from the longitudinal axis of the cutting head that is larger than a radius of the third portion from the longitudinal axis of the cutting head.

13. The cutting head as set forth in claim 1, wherein the at least one axially extending recess extends only along the first portion and the first frustoconical transition region.

14. The cutting head as set forth in claim 1, wherein the at least one axially extending recess extends axially over more than one half of a length of the first portion.

15. A cutting tool comprising:
    a cutting head including a cutting portion and a shank portion, the shank portion having a first end adjacent the cutting portion and a second end , the cutting portion and the shank portion being integrally formed of a uniform material, the cutting portion including a plurality of integrally formed cutting edges, and the shank portion having a first portion having a first end and a second end, the first end of the first portion being closer to the cutting portion than the second end of the first portion, the first portion of the shank portion having a first diameter, the cutting head further comprising a second portion having a second diameter smaller than the first diameter of the first portion, and a cylindrical third portion having a third diameter larger than the second diameter of the second portion and smaller than the first diameter of the first portion, the first portion being closer to the first end of the shank portion than the second and third portions and the third portion being disposed closer to the second end of the shank portion than the first and second portions, the first portion of the shank portion having an exterior surface including at least one axially extending recess extending parallel to a longitudinal axis of the cutting head from an end of the first portion closest to the second portion toward the first end of the shank portion, and a frustoconical transition region disposed between the first and second portions of the shank portion, wherein the at least one axially extending recess extends into and ends on a surface of the first frustoconical transition region; and
    a toolholder including a body having a first end and a second end, and an axial opening extending from the first end toward the second end of the body, the axial opening including a first portion having a first diameter at least as large as the first diameter of the first portion of the shank portion, wherein the shank portion has a second portion having a second diameter smaller than the first diameter, and a cylindrical third portion having a third diameter larger than the second diameter and smaller than the first diameter, the first portion of the shank portion being closer to the first end of the shank portion than the second and third portions and the third portion being disposed closer to the second end of the shank portion than the first and second portions of the shank portion, the first portion of the shank portion having an exterior surface including at least one axially extending recess extending from an end of the first portion furthest from the cutting portion toward the first end of the shank portion, the first portion of the axial opening having an interior surface including at least one axially extending recess, at least one ball or axially extending pin being disposed in the at least one axially extending recess of the exterior surface of the first portion of the shank portion and the at least one axially extending recess of the interior surface of the first portion of the axial opening so that the cutting head is non-rotatable relative to the toolholder, and the cutting head being entirely formed of a pressed and sintered cemented carbide material.

16. The cutting head as set forth in claim 15, wherein the cutting head comprises at least one cutting head flute and the toolholder comprises at least one toolholder flute, and wherein the at least one cutting head flute and the at least one tool holder flute align when the at least one ball or axially extending pin is disposed in the at least one axially extending recess of the exterior surface of the first portion of the shank portion and the at least one axially extending recess of the interior surface of the first portion of the axial opening so that the cutting head is non-rotatable relative to the toolholder.

\* \* \* \* \*